United States Patent Office 2,989,853
Patented June 27, 1961

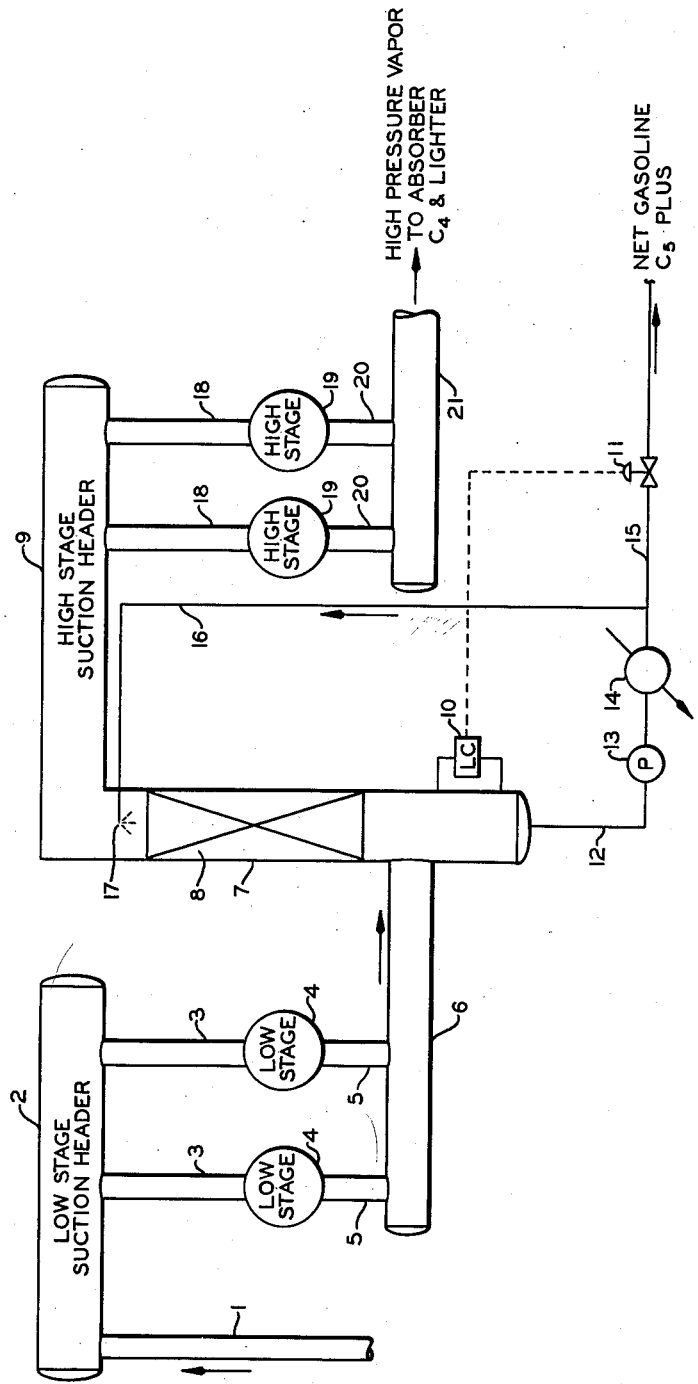

2,989,853
MULTISTAGE GAS COMPRESSION PROCESS
AND APPARATUS
Forrest E. Gilmore, Independence, Kans., assignor to
Phillips Petroleum Company, a corporation of Delaware
Filed June 5, 1958, Ser. No. 740,006
7 Claims. (Cl. 62—11)

This invention relates to separation of high boiling point material from low boiling point material in a gaseous stream. In one of its aspects, this invention relates to a method of operation of a multistage gas compression system.

It is known in the art to separate easily liquefiable components from a gaseous mixture by compression. Such systems commonly employ a plurality of compression stages with cooling between stages, each stage recovering a portion of the liquefiable components, each successive stage recovering the more difficultly liquefiable material. Frequently a two stage compression system can be employed with a cooling and separating means therebetween. Even in those systems employing more than two stages, any pair of stages can be treated as a simple two stage compression system. Such two stage compression systems, having an inner cooler therebetween, are widely used for separating liquefiable material from gaseous streams. The indirect cooling coils generally employed between two such compression stages are necessarily bulky and high surface area, they generally create resistance to the gas flow thus increasing pressure drop from the first stage outlet to the second stage inlet, frequently the gas being separated contains corrosive materials such as water and/or sulfur compounds, etc.

By the practice of this invention corrosion as a factor is substantially eliminated, pressure drop is minimized with the attendant reduction in power loss, and the initial cost of equipment is minimized.

An object of this invention is to provide an improved means of cooling gas between compression stages;

Another object of this invention is to provide a method of cooling gases between compression stages without the attendant pressure drop of conventional coolers;

A third object of this invention is to provide a lower cost means for cooling gases between compression stages;

Still another object of this invention is to provide a means of cooling corrosive gases between cooling stages; and, Still other objects, advantages and features of this invention will be obvious to those skilled in the art having been given this disclosure.

According to this invention, the compressed gas and liquid from a first compressor in a two stage compression system is passed to a separation zone, the liquid is removed and at least a portion thereof is cooled and recycled to said separation zone wherein it flows countercurrent to the gas stream thereby cooling said gas stream.

This invention is broadly applicable for cooling gas between compression stages wherein a liquefiable fraction is removed between each stage of compression. The invention is particularly applicable to hydrocarbon fractions such as wet natural gas, light vapor from fractionator cuts, light vapor from cracked petroleum stocks and the like.

This invention will be further described in conjunction with the drawing which is a schematic flow diagram of a two stage compression process utilizing the cooling method of this invention.

Referring now to the drawing, a gas stream comprising a mixture of gases passes via conduit 1 to first stage suction header 2. The gas from header 2 passes via conduits 3 to compressors 4. These are similar compressors and it will be understood by those skilled in the art that one or a plurality of compressors can be utilized. The gas is compressed in compressors 4 thereby causing some of the higher boiling components of the gas stream to be liquefied. The stream then comprising both gas and liquid passes via conduits 5 and 6 to packed column 7 wherein the liquid separates out and gravitates to the lower part of the column and the gases flow upward through the packing 8 to the high stage suction header 9. Liquid level controller 10 is operably installed in the lower part of column 7 to control the level of liquid in said column and consequently the amount of recycle cooling liquid. The liquid passes via conduit 12, constant volume pump 13 and cooler 14 to conduit 15. Power valve 11, operably connected to controller 10, is installed in conduit 15. A portion of the cooled liquid passes via conduit 16 to nozzle 17 where it flows countercurrent to the rising gas stream thereby cooling said stream. The remaining liquid passes to storage or further treatment via conduit 15. Level controller 10 operates valve 11 to divide the flow between conduit 16 and to storage responsive to changes in the liquid level. The cooled gases from header 9 pass to a pair of high stage compressors 19 via conduits 18 and the compressed gases then pass via conduits 20 and 21 to further processing as desired. For example, these gases can be passed to an absorber wherein additional high molecular weight material is separated out by absorption in a suitable absorbent.

Those skilled in the art will see many modifications. For example, cooler 14 could be placed in conduit 16 and an auxiliary cooler can be used in this line. The number of compressors can vary depending upon economic considerations. Necessary control valves, pumps and the like can be supplied by those skilled in the art. Means such as trays, plates and the like can be utilized to contact gas and liquid in column 17 rather than packing material. Liquid from one stage can be used to contact gas from some other stage if desired. These and many other modifications can be made by those skilled in the art, these not being my invention.

*Specific embodiment*

To demonstrate some of the advantages of this invention, a gas stream consisting of light vapors from a hydrocarbon cracking zone and comprising 1.3% $H_2S$, 2.5% $CO_2$, 1.3% $CO+N_2$, 32.1% H, 10.7% methane, 3.9% ethylene, 5.5% ethane, 10.7% propylene, 3.5% propane, 12.9% butylenes, 3.1% isobutane, 1.5% normal butane, 9.6% C5's and heavier, and 1.4% water, is passed to the suction side of a compressor at 14.7 p.s.i.a. and room temperature. The compressor with a compression ratio of 5:1 increases the pressure to 73.5 p.s.i.a. and the temperature to 230° F. The compressed material passes to a packed column wherein it is contacted by a countercurrent flow of cool liquid thereby lowering the gas temperature to 89° F. In this contacting zone most of the butylenes and heavier material comes out as liquid and is withdrawn from the column. The liquid passes through a cooler and a portion cycled to the column to contact gas. The cooled gas, comprising some butylenes and the lighter material, passes to the intake of the second stage compressor at 72.5 p.s.i.a. and 89° F. wherein it is compressed to 307 p.s.i.a. By such operation, a total pressure drop of 1 p.s.i. is incurred and a compression ratio of 4.23 is required. This requires a total brake horse power of 88 per million cubic feet per stream day plus about 3 horse power for liquid circulation. For each million cubic feet of gas processed, about 323 barrels of liquid is recovered. Any corrosive action is on the packing material which is relatively inexpensive.

Using the same feed stream and same separation of 323 barrels of liquid per million cubic feet of gas in a conventional system, the gas from the first stage compressor passes an indirect cooling coil to cool same to 90° F. The mixture then passes to a separator wherein liquid is allowed to gravitate to the bottom of the separator and the gases pass overhead to the second stage compressor. The pressure drop across this system, i.e., from low stage discharge to high stage intake is 10 p.s.i. To get a high stage discharge pressure of 307 p.s.i.a., a compression ratio of 5:1 is required and 101 brake horse power per million cubic feet per stream day or about 10 horse power more than the invention method. Also, the hydrogen sulfide and water containing gas come in contact with the cooling coils and corrosive resistant materials are required.

From the above embodiments, it can be seen that the conventional system requires about 14 percent more horse power per million cubic feet of gas than does the system herein disclosed.

I claim:

1. In a process of separating liquid from gas by multistage gas compression and cooling between stages the improvement comprising, removing liquid from the compressed gas at a first stage, cooling at least a portion of the removed liquid and directly contacting the compressed gas with said cooled liquid.

2. In a process wherein liquefiable material is separated from a gaseous stream by multistage compression and cooling between compressions the improvement comprising passing the compressed material from a first stage to a separation zone, withdrawing liquid from said separation zone, cooling the withdrawn liquid, cycling a portion of the cooled liquid to said separation zone, passing the cycled cool liquid in direct countercurrent contact with said compressed material in said separation zone thereby cooling same, and passing the cooled gases to the next compression stage.

3. A process for recovering higher boiling components from lower boiling components from a gaseous stream which comprises compressing said gases in a first compression zone to a pressure wherein a portion of the gas stream is liquefied, removing the liquid so formed, cooling at least a portion of the removed liquid, passing at least a portion of the cooled liquid in direct countercurrent contact with the compressed gas thereby cooling same and further compressing the thus cooled gas.

4. A process for separating an easily liquefiable component from a gaseous stream which comprises compressing said gaseous stream to a pressure wherein at least a portion of the liquefiable material is liquid, passing the compressed material to a low level in a separation and contacting zone, withdrawing liquid from a lower level of said separation and contacting zone, cooling the liquid so withdrawn, cycling a portion of the cooled liquid to an upper level in said separation and contacting zone, passing the cycled liquid downward in direct countercurrent contact with the gaseous phase in said separation and contacting zone thereby cooling said gaseous phase, withdrawing the thus cooled gas from an upper level of said separation and contacting zone and further compressing the withdrawn gas.

5. The process of claim 4 wherein the gas is light vapors from a petroleum fractionator.

6. The process of claim 4 wherein the gas is light vapors from petroleum cracking.

7. In a process of separating liquid from wet natural gas by multistage gas compression and cooling between stages, the improvement comprising, removing liquid gasoline from the compressed gas at a first stage, cooling at least a portion of the removed liquid gasoline and directly contacting the compressed wet natural gas with said cooled liquid.

References Cited in the file of this patent

UNITED STATES PATENTS

| | | |
|---|---|---|
| 2,090,163 | Twomey | Aug. 17, 1937 |
| 2,252,738 | Stoever | Aug. 19, 1941 |
| 2,530,602 | Dennis | Nov. 21, 1950 |
| 2,572,933 | Houvener | Oct. 31, 1951 |
| 2,619,814 | Kniel | Dec. 2, 1952 |
| 2,692,484 | Etienne | Oct. 26, 1954 |
| 2,729,953 | Schilling | Jan. 10, 1956 |
| 2,794,334 | Peaslee et al. | June 4, 1957 |
| 2,836,040 | Schilling | May 27, 1958 |
| 2,873,583 | Potts et al. | Feb. 17, 1959 |